United States Patent
Mink

[11] 3,779,059
[45] Dec. 18, 1973

[54] HEAD FORMING TOOL
[75] Inventor: George Mink, Warren, Mich.
[73] Assignee: USI Corporation, Pasadena, Calif.
[22] Filed: Oct. 29, 1971
[21] Appl. No.: 193,873

[52] U.S. Cl.............................. 72/67, 72/112, 72/406
[51] Int. Cl................................................ B21j 15/36
[58] Field of Search.................... 72/67, 406, 429, 72/112, 122, 124, 126, 115

[56] References Cited
UNITED STATES PATENTS

| | | | |
|---|---|---|---|
| 2,739,726 | 3/1956 | Bregen | 72/126 |
| 1,359,625 | 11/1920 | Slick | 72/67 |
| 3,151,657 | 10/1964 | Beranek | 72/124 |
| 3,440,850 | 4/1969 | Friedrich | 72/67 |
| 3,494,161 | 2/1970 | Silichev | 72/67 |
| 3,523,442 | 8/1970 | Marciniak | 72/406 |
| 3,620,060 | 11/1971 | Ramseier | 72/112 |
| 3,653,243 | 4/1972 | Ramseier | 72/126 |
| 3,173,281 | 3/1965 | Bodmer | 72/67 |

*Primary Examiner*—Richard J. Herbst
*Assistant Examiner*—Gene P. Crosby
*Attorney*—J. King Harness et al.

[57] ABSTRACT

A tool for forming heads on rivets or the like. The tool includes a driven member that is rotatable about an axis and which has an internal cavity. Supported within the cavity is a tool holder which is disposed at an angle to the axis of rotation of the driven member. A work forming member or tool is rotatably journalled within the tool holder on anti-friction bearings and engages the rivet for offsetting it upon rotation.

8 Claims, 3 Drawing Figures

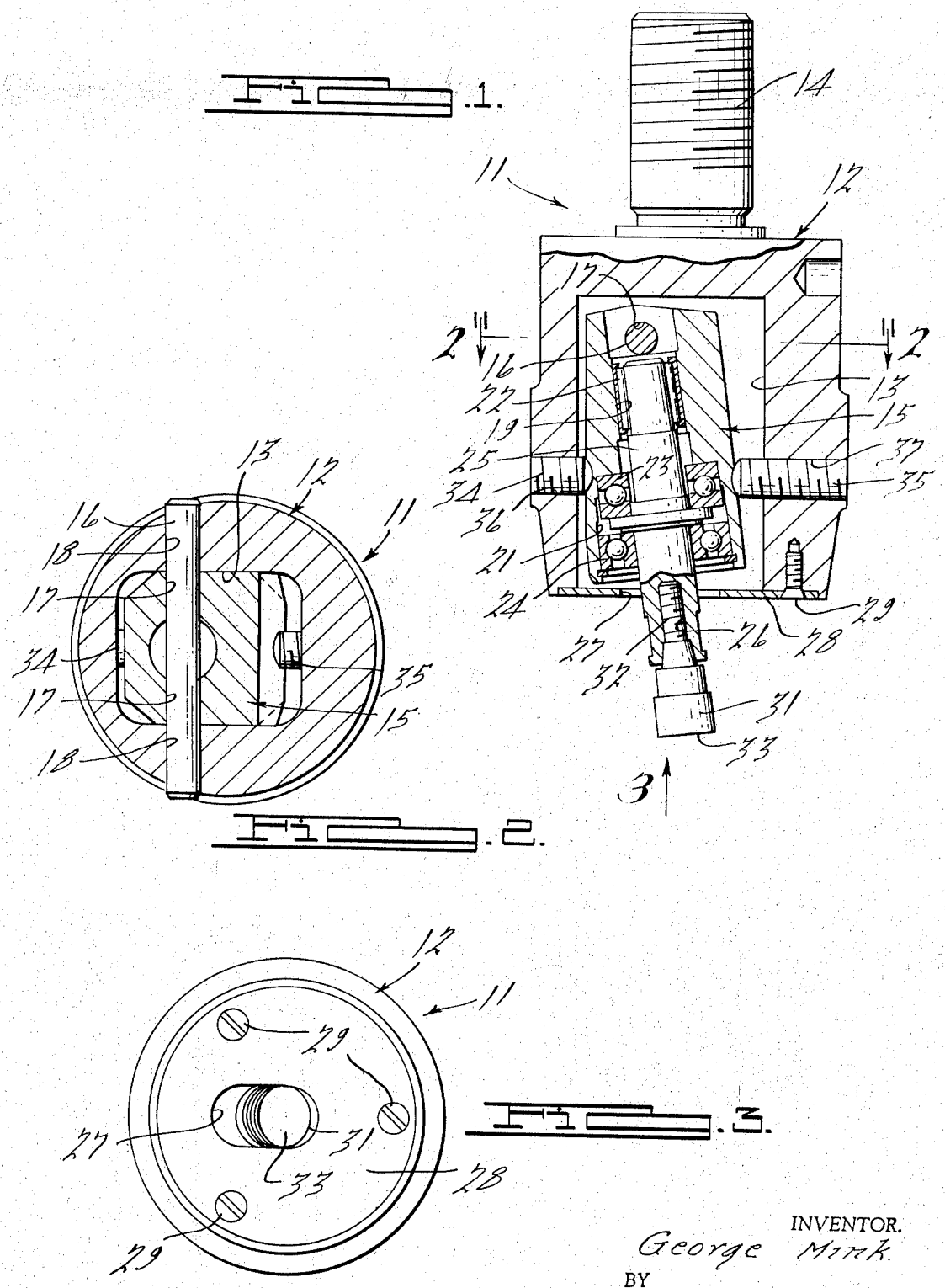

HEAD FORMING TOOL

BACKGROUND OF THE INVENTION

This invention relates to a head forming tool and more particularly to an improved tool for forming heads on rivets or the like in a noiseless manner.

NOrmally heads are formed on rivets by impact tools. Such tools are extremely noisy in operation. The impact forming of rivets additionally places high stresses on the material which may result in premature failure. In order to offset these deficiences, it has been proposed to provide a tool that wipes across the surface of the rivet and forms a gradual upset during the wiping action.

It is an object of this invention to provide an improved noiseless tool for upsetting rivets or the like.

It is a further object of this invention to provide a noiseless head forming tool in which the work forming member may be adjusted as to its position.

It is another object of this invention to provide a compact improved head forming tool in which the work forming member is journalled by anti-friction bearings.

SUMMARY OF THE INVENTION

A tool embodying this invention is particularly useful for upsetting the end of a rivet or the like. The tool includes a driven member that is rotatable about an axis and which defines a cavity at one of its ends. A tool holder is received within the cavity and is affixed therein for rotation with the driven member. Means are provided for supporting an upsetting tool upon the tool holder at an angle relative to the axis of rotation of the driven member for forming an upset on the end of the rivet or the like upon rotation of the driven member.

Another feature of the invention is also adapted to be embodied in a tool for upsetting the end of a rivet or the like. Such an embodiment includes a tool holder that is driven about a rotational axis and which supports an upsetting tool by means of anti-friction bearing means for rotation of the upsetting tool about an axis that is angularly disposed relative to the axis of rotation of the tool holder.

BRIEF DESCRIPTION OF THE DRAWINGS

FIG. 1 is a side elevational view, with a portion broken away about the axis of rotation, of a head forming tool embodying this invention.

FIG. 2 is a cross sectional view taken along the line 2—2 of FIG. 1.

FIG. 3 is an end view of the tool taken in the direction of the arrow 3 in FIG. 1.

DETAILED DESCRIPTION OF THE PREFERRED EMBODIMENT

A head forming tool embodying this invention is identified generally by the reference numeral 11. The tool 11 is comprised of a driven housing 12 having a generally cylindrically shaped body that defines a cavity 13 that extends through its lower face. A means for rotatably driving the housing 12 is provided in the form of a threaded end 14 which is adapted to be affixed to any driven member. Alternatively, a female threaded opening may be formed at the one end of the driven housing for accomplishing the driving action. The axis of the portion 14 is disposed eccentrically relative to the cavity 13.

A tool holder or bearing housing, indicated generally by the reference numeral 15, is positioned in the cavity 13. The tool holder 15 is supported for pivotal movement relative to the driven housing 12 by means of a pin 16 that passes through a pair of aligned openings 17 in the tool holder and a pair of aligned openings 18 in the driven housing. The axis of the pin 16 is disposed eccentrically relative to the axis of rotation of the housing 11.

The tool holder 15 is formed with a stepped bore comprised of a smaller diameter portion 19 and a larger diameter portion 21. A roller or needle type anti-friction bearing 22 is positioned in the bore portion 19 and a pair of ball bearings 23 and 24 are positioned in the larger diameter portion 21.

The bearings 22, 23 and 24 rotatably journal an arbor 25 having a female threaded opening 26 formed at its lower end. The arbor 24 extends through an elongated generally oval shape opening 27 formed in a cover plate 28 that is affixed to the lower end of the driven housing 12 by means of screws 29. A forming tool 31 has a male threaded end 32 that is threaded into the opening 26 and a face 33 that is adapted to engage a rivet for upsetting the latter.

The angular position of the tool 31 and the tool holder 15 within the cavity 13 is adjusted by means of a pair of screws 34 and 35 that are threaded into tapped openings 36 and 37, respectively. The openings 36 and 37 intersect the cavity 13 on diametrically opposite sides of the axis of rotation of the driven housing 12. The screws 34 and 35 bear against the tool holder 15 and their axial positions may be adjusted to adjust the angular position of the tool holder 15 on its supporting pivot pin 16.

Upon rotation of the driven housing 12 the work forming face 33 of the forming tool 31 will pass across the end of the rivet with an arbital motion and upset it to form a locking head. Because of this wiping action, a noiseless operation will result. The tool 31 and its supporting arbor 25 are free to rotate in the anti-friction bearings 22, 23 and 24 so that there will be no scuffing action between the rivet and the tool face 33. This reduces wear.

It is to be understood that the foregoing description is that of a preferred embodiment of the invention. Various changes and modifications may be made without departing from the spirit and scope of the invention as defined by the appended claims.

I claim:

1. A tool for upsetting the end of a rivet or the like comprising a driven member rotatable about an axis, said driven member defining a cavity at one of its ends, a tool holder received in said cavity, means for affixing said tool holder for rotation with said driven member, means for supporting and upsetting tool upon said tool holder at an angle relative to the axis of rotation of said driven member for forming an upset on the end of the rivet or the like upon rotation of said driven member and means for adjusting the angle of said upsetting tool relative to the axis of said driven member.

2. A tool as set forth in claim 1 wherein the means for adjusting the angle of the upsetting tool includes means for adjusting the angular relationship of the tool holder relative to the cavity.

3. A tool as set forth in claim 2 wherein the means for affixing the tool holder for rotation with the driven member includes a pivot pin extending through the tool holder and the driven member and pivotally supporting said tool holder within the cavity, the means for adjusting the angular position including means for fixing the angular position of said tool holder relative to said pivot pin.

4. A tool as set forth in claim 1 wherein the means for supporting the upsetting tool upon the tool holder includes anti-friction bearing means carried by the tool holder.

5. A tool for upsetting the end of a rivet or the like comprising a driven member having a shank portion adapted to be affixed to a driving head for rotatably driving said driven member about an axis, a cavity formed in said driven member and disposed eccentrically to said axis, a tool holder extending into said cavity, means for affixing said tool holder for rotation with said driven member, and means for supporting an upsetting tool in said tool holder at an angle relative to the axis of rotation of said driven member for forming an upset on the end of the rivet or the like upon rotation of said driven member.

6. A tool as set forth in claim 5 further including a closure plate affixed to the driven member and extending across the cavity, said closure plate having an opening adapted to pass the upsetting tool.

7. A tool as set forth in claim 5 wherein the means for affixing the tool holder for rotation with the driven member includes a pin extending transversely through the cavity.

8. A tool as set forth in claim 5 wherein the means for supporting the upsetting tool comprises spaced anti-friction bearing means carried by the tool holder.

* * * * *

UNITED STATES PATENT OFFICE
CERTIFICATE OF CORRECTION

Patent No. 3,779,059            Dated December 18, 1973

Inventor(s)  George Mink

It is certified that error appears in the above-identified patent and that said Letters Patent are hereby corrected as shown below:

On the Abstract page:

"[73] Assignee: USI Corporation, Pasadena, Calif."
should be -- [73] Assignee: VSI Corporation, Pasadena, Calif.--

Column 1, line 7:

"NOrmally" should be --Normally--

Signed and sealed this 18th day of June 1974.

(SEAL)
Attest:

EDWARD M. FLETCHER, JR.              C. MARSHALL DANN
Attesting Officer                     Commissioner of Patents